Patented June 15, 1937

2,084,213

UNITED STATES PATENT OFFICE 2,084,213

RESINOUS MATERIAL AND METHOD OF PRODUCING

Arthur L. Osterhof, Kenvil, N. J., assignor to Hercules Powder Company, Wilmington, Del., a corporation of Delaware No Drawing. Application December 27, 1930, Serial No. 505,207

19 Claims. (Cl. 260—3)

My invention relates to an improvement in rosin products and method of producing. More particularly my invention relates to rosin condensation products and method for their production.

In accordance with my invention, I have produced a rosin condensation product which may be in the form of rosin or which may be esterified if desired, or which may be produced as an esterification product, depending upon the mode of procedure. The product whether produced as a rosin product or as a rosin esterification product, will be found to be of relatively high viscosity and high melting point as compared with the rosin treated.

The product will be found to be highly advantageous for use, for example, in varnishes, lacquers, etc., etc. and, in fact, for all uses for which rosins of higher viscosity and melting point may be desirable. Further, the product where produced as a rosin product will be found advantageous for the preparation of rosin esters of higher viscosity and melting point, which will be found desirable for all uses for which rosin esters are required or desirable and for which uses the product where produced as an esterification product will likewise be found advantageous.

In the production of the product by the method in accordance with my invention, rosin, as for example, wood or gum rosin, of any commercial grade or alternatively commercial abietic acid, is condensed with an aldehyde in the presence of an acid. The aldehyde may be formaldehyde, acetaldehyde, benzaldehyde, etc., or an operable equivalent therefor. Where condensation is effected in the presence of an organic acid, it will be found that some of the organic acid will esterify with alcoholic groups formed by the condensation, while where the condensation is effected in the presence of an inorganic acid, no esterification will take place. Where the product is produced as a rosin product, it may, if desired, be readily esterified and alternatively, where the product is produced as an esterification product, the acid condensing agent which is esterified with the condensation product may be readily removed, for example, by saponification with an excess of alkali and finally freeing the resin acids with an excess of an acid, as for example, acetic, hydrochloric, etc.

In carrying out the method in accordance with my invention, it has been found that rosin or abietic acid may be condensed with either one or two molecules, or even four under proper conditions, of an aldehyde, as formaldehyde, with one molecule of abietic acid. The method involves treatment of abietic acid or rosin with an aldehyde or operable equivalent in the presence of an acid. The treatment, where necessary to effect condensation, will be at an elevated temperature. For example, as has been indicated, the aldehyde may be formaldehyde, acetaldehyde, benzaldehyde, etc., etc. or any operable equivalent therefor. As the condensing agent inorganic acids, as for example, hydrochloric, phosphoric, etc., etc. acids may be used or an organic acid, as for example p-toluene sulfonic, acetic, salicylic, benzoic, phthalic, oxalic, malic, tartaric, mucic, gluconic, citric, etc., etc. may be used.

As illustrative of the practical adaptation of the method in accordance with my invention, for example:

1 mol. of abietic acid
2 mols of $CH_2O$ as paraformaldehyde
1 to 1.5 mols of acetic acid are heated under a reflux condenser or in a closed vessel at a temperature of say, for example, 100° C.–130° C. until the odor of formaldehyde has disappeared or, for example, from about one to sixteen hours. The product is then diluted with a suitable solvent, as for example, gasoline, benzene, toluene, alpha pinene, etc., etc., or any operable equivalent therefor, and the excess acid is removed by washing with water or a dilute alkali solution, as for example, a solution of sodium carbonate. The use of a dilute alkali solution will be found advantageous where the acid used is difficultly soluble in water. In the case of some acids the acid may desirably be removed by distillation. After removal of the excess acid the product is recovered by distilling off the solvent.

In the above illustration the product will be a rosin of increased viscosity and melting point. Where an organic acid is used the product will be found to be esterified with the acid.

Where the product is esterified with the acid, the acid esterified with the rosin condensation product may be removed by, for example, saponification of the rosin with an excess of alkali, as for example, caustic soda or potash and treated with an excess of an acid, as acetic acid, sulphuric acid, hydrochloric acid, or an operable equivalent therefor, to free the resin acids. On washing with water or, where desirable, with dilute alkali solution, the product, as a rosin condensation product of high viscosity and melting point as compared with the ester, will, in most cases, be obtained.

As further illustrative of the practical adaptation of the method in accordance with my invention, for example, 1 mol of commercial abietic acid dissolved in 300 cc. of toluene, 2 mols of CH₂O as paraformaldehyde and 0.002 mol. of p-toluene sulfonic acid are warmed gently to the boiling point and refluxed until the odor of formaldehyde disappears, say from two to four hours.

In carrying the method in accordance with my invention into practice where the acid used is in solid form, it may be found desirable to utilize a small amount of solvent for the acid. The solvent may be any desired solvent for the acid which will be inert to the aldehyde and rosin and may, for example, be benzene, gasoline, toluene, water, etc., etc.

The treated mixture is then further diluted if necessary, washed with water and the solvent distilled off to obtain rosin condensation product, which will be found to be a rosin of high viscosity and melting point.

As has been indicated, where the product is produced as a rosin condensation product as compared with an ester, or where the removal of the acid condensing agent esterified with the condensation product has been effected and it is desirable to esterify the product, such may be readily accomplished, for example, by heating say 100 parts of rosin condensation product with 20–50 parts of a suitable esterification agent, as for example, phthalic anhydride, phthalic acid, acetic anhydride, acetic acid, or an operable equivalent therefor. For example, the condensation product and phthalic anhydride may be heated to a temperature of say 150° C.–170° C. for say 30 minutes. The product may then be diluted with a solvent immiscible with water, excess of acid washed out with water or with a dilute alkali solution and the benzene removed for the recovery of the esterification product by distillation.

As has been indicated, in producing the product in accordance with my invention and in the carrying out of the method embodying my invention, abietic acid, as commercial abietic acid, may be used, or alternatively, various grades of rosin may be used, since the reaction requires only the presence of a reactive double bond. Further, it will be understood that the method in accordance with my invention is adaptable to the production of rosin or abietic acid ester condensation products by the treatment with an aldehyde and an acid condensing agent, as fully described above, of a rosin or abietic acid ester, as for example, glycerin ester, ethyl abietate, methyl abietate, glycol abietate, etc., etc. The ester condensation product will have a high viscosity and melting point relative to the ester treated and will be similar to the esters of the esterified condensation products produced in accordance with my invention where rosin is treated with an aldehyde and an organic acid or where the rosin condensation product produced in accordance with my invention is subjected to esterification.

It will be understood that I contemplate as within the scope of my invention the rosin condensation product whether produced as a rosin product or as an esterified condensation product and whether treated to effect esterification or produced by the treatment of a resin ester. Further, it will be understood that I contemplate as within the scope of my invention, insofar as it relates to method, the treatment of rosin or abietic acid and of rosin or abietic acid esters, with an aldehyde in the presence of an acid condensing agent. It will also be understood that I do not contemplate my invention as limited to the use of the aldehydes, acids, etc. more specifically mentioned herein, but to the contrary that I contemplate the use of operable equivalents therefor.

What I claim and desire to protect by Letters Patent is:

1. The method for producing an abietic acid product which includes effecting direct condensation of esterified abietic acid with an aldehyde in the presence of an acid selected from the group consisting of inorganic acids, organic carboxylic acids other than resin acids, and sulfonic acids.

2. The method for producing an abietic acid product which includes effecting direct condensation of esterified abietic acid with an aldehyde in the presence of an organic carborylic acid other than a resin acid.

3. The method for producing an abietic acid product which includes effecting direct condensation of esterified abietic acid with an aldehyde in the presence of an inorganic acid.

4. The method for producing an abietic acid product, which includes effecting direct condensation of abietic acid with an aldehyde in the presence of p-toluene sulfonic acid.

5. The method for producing an abietic acid product, which includes effecting direct condensation of esterified abietic acid with an aldehyde in the presence of malic acid.

6. The method for producing an abietic acid product which includes effecting direct condensation of esterified abietic acid with an aldehyde in the presence of hydrochloric acid.

7. The method for producing an abietic acid product, which includes effecting direct condensation of esterified abietic acid with an aldehyde in the presence of p-toluene sulfonic acid.

8. The method for producing an abietic acid product which includes effecting direct condensation of esterified abietic acid with formaldehyde in the presence of malic acid.

9. The method for producing an abietic acid product, which includes effecting direct condensation of esterified abietic acid with formaldehyde in the presence of hydrochloric acid.

10. The method for producing an abietic acid product, which includes effecting direct condensation of esterified abietic acid with formaldehyde in the presence of p-toluene sulfonic acid.

11. The method for producing an abietic acid product, which includes effecting direct condensation of esterified abietic acid with formaldehyde in the presence of an acid selected from the group consisting of inorganic acids, organic carboxylic acids other than resin acids, and sulfonic acids.

12. The method for producing an abietic acid product, which includes effecting direct condensation of esterified abietic acid with formaldehyde in the presence of an organic carboxylic acid other than a resin acid.

13. The method for producing an abietic acid product, which includes effecting direct condensation of esterified abietic acid with formaldehyde in the presence of an inorganic acid.

14. As a new composition of matter the product of the reaction of esterified abietic acid with an aldehyde in the presence of a sulfonic acid.

15. As a new composition of matter the product of the reaction of esterified abietic acid with an aldehyde in the presence of an organic carboxylic acid other than a resin acid.

16. As a new composition of matter the product of the reaction of esterified abietic acid with an aldehyde in the presence of an inorganic acid.

17. The method for producing an abietic acid product which includes effecting direct condensation of an abietic acid compound selected from the group consisting of abietic acid and abietic acid esters with an aldehyde in the presence of p-toluene sulfonic acid.

18. The method for producing an abietic acid product which includes effecting direct condensation of esterified abietic acid with an aldehyde in the presence of a sulfonic acid.

19. The method for producing an abietic acid product which includes effecting direct condensation of esterified abietic acid with formaldehyde in the presence of a sulfonic acid.

ARTHUR L. OSTERHOF.

CERTIFICATE OF CORRECTION.

Patent No. 2,084,213.

June 15, 1937.

ARTHUR L. OSTERHOF.

It is hereby certified that error appears in the printed specification of the above numbered patent requiring correction as follows: Page 1, second column, line 18, strike out the period after "mol"; page 2, first column, line 7, for "disappers" read disappears; and second column, line 18, claim 2, for "carborylic" read carboxylic; and that the said Letters Patent should be read with these corrections therein that the same may conform to the record of the case in the Patent Office.

Signed and sealed this 14th day of September, A. D. 1937.

Henry Van Arsdale (Seal)

Acting Commissioner of Patents.

16. As a new composition of matter the product of the reaction of esterified abietic acid with an aldehyde in the presence of an inorganic acid.

17. The method for producing an abietic acid product which includes effecting direct condensation of an abietic acid compound selected from the group consisting of abietic acid and abietic acid esters with an aldehyde in the presence of p-toluene sulfonic acid.

18. The method for producing an abietic acid product which includes effecting direct condensation of esterified abietic acid with an aldehyde in the presence of a sulfonic acid.

19. The method for producing an abietic acid product which includes effecting direct condensation of esterified abietic acid with formaldehyde in the presence of a sulfonic acid.

ARTHUR L. OSTERHOF.

CERTIFICATE OF CORRECTION.

Patent No. 2,084,213.

June 15, 1937.

ARTHUR L. OSTERHOF.

It is hereby certified that error appears in the printed specification of the above numbered patent requiring correction as follows: Page 1, second column, line 18, strike out the period after "mol"; page 2, first column, line 7, for "disappers" read disappears; and second column, line 18, claim 2, for "carborylic" read carboxylic; and that the said Letters Patent should be read with these corrections therein that the same may conform to the record of the case in the Patent Office.

Signed and sealed this 14th day of September, A. D. 1937.

Henry Van Arsdale (Seal)

Acting Commissioner of Patents.

CERTIFICATE OF CORRECTION.

Patent No. 2,084,213. June 15, 1937.

ARTHUR L. OSTERHOF

It is hereby certified that error appears in the printed specification of the above numbered patent requiring correction as follows: Page 1, second column, line 18, strike out the period after "mol"; page 2, first column, line 7, for "disappers" read disappears; and second column, line 18, claim 2, for "carborylic" read carboxylic; and that the said Letters Patent should be read with these corrections therein that the same may conform to the record of the case in the Patent Office.

Signed and sealed this 14th day of September, A. D. 1937.

Henry Van Arsdale (Seal) Acting Commissioner of Patents.